United States Patent

[11] 3,585,763

| [72] | Inventor | Wilbur R. Clark<br>Waynesboro, Pa. |
| --- | --- | --- |
| [21] | Appl. No. | 744,349 |
| [22] | Filed | July 12, 1968 |
| [45] | Patented | June 22, 1971 |
| [73] | Assignee | Litton Industries Inc. |

[54] WORK-DRIVING DEVICE FOR CAMSHAFT GRINDER
12 Claims, 7 Drawing Figs.

[52] U.S. Cl. .................................................. 51/237
[51] Int. Cl. ............................................ B24b 5/04,
B24b 41/06
[50] Field of Search........................................ 51/100,
101, 105, 127, 131, 145, , 237, 237 CS, 105 SP,
56; 82/40, 40.1

[56] References Cited
UNITED STATES PATENTS
| 2,053,866 | 9/1936 | Flygare.................... | 51/101 |
| 2,109,386 | 2/1938 | Green...................... | 51/101 |
| 2,940,227 | 6/1960 | Flohr....................... | 51/237 CS |

*Primary Examiner*—Othell M. Simpson
*Attorney*—Diller, Brown, Ramick & Holt

ABSTRACT: This disclosure relates to a work-driving apparatus, particularly for a cam contour grinder, for applying a driving torque at two angularly spaced points on a workpiece so that the entire force transmitted by the work-driving apparatus acts to turn the workpiece and there is no force to cause radial displacement of the workpiece. The work-driving apparatus is particularly adapted for use in conjunction with a workpiece having an end portion of a reduced diameter with a keyway formed therein. The work-driving apparatus includes a driving block which carries a locating pin which is proportioned for a close fit in the keyway to maintain the workpiece in a predetermined oriented position during the grinding thereof. The driving block is mounted for floating movement so as to compensate for variations in workpieces and is pivotable about the locating pin to engage a separately mounted jaw carried thereby with the workpiece at a point circumferentially remote from the locating pin.

PATENTED JUN 22 1971
3,585,763
SHEET 1 OF 2
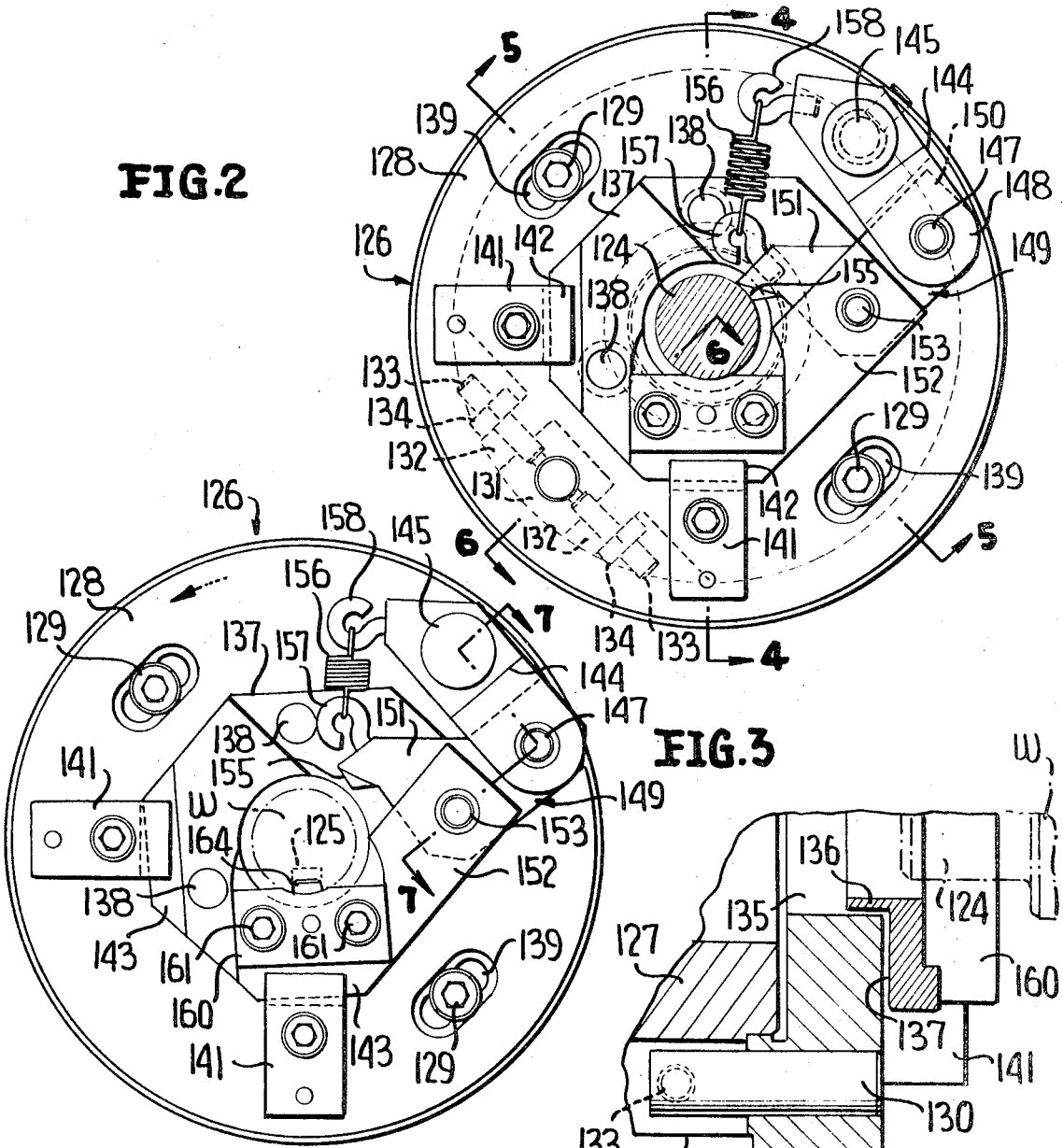
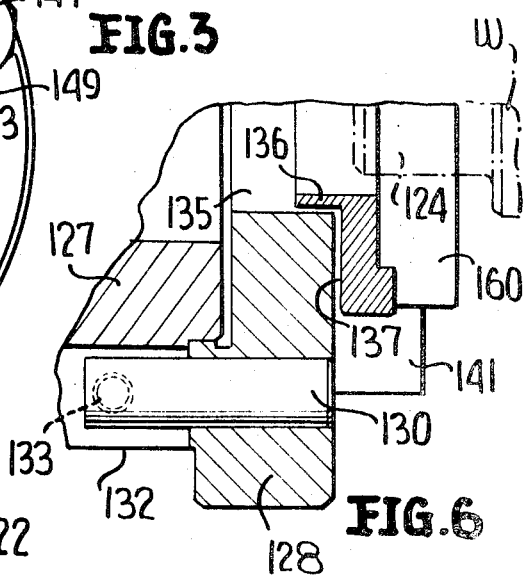
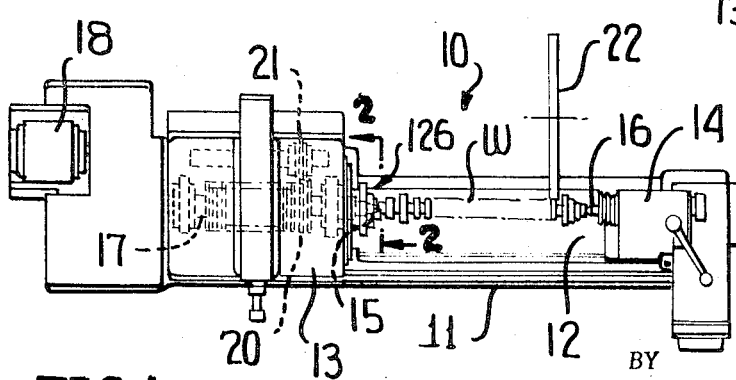
INVENTOR
WILBUR R. CLARK

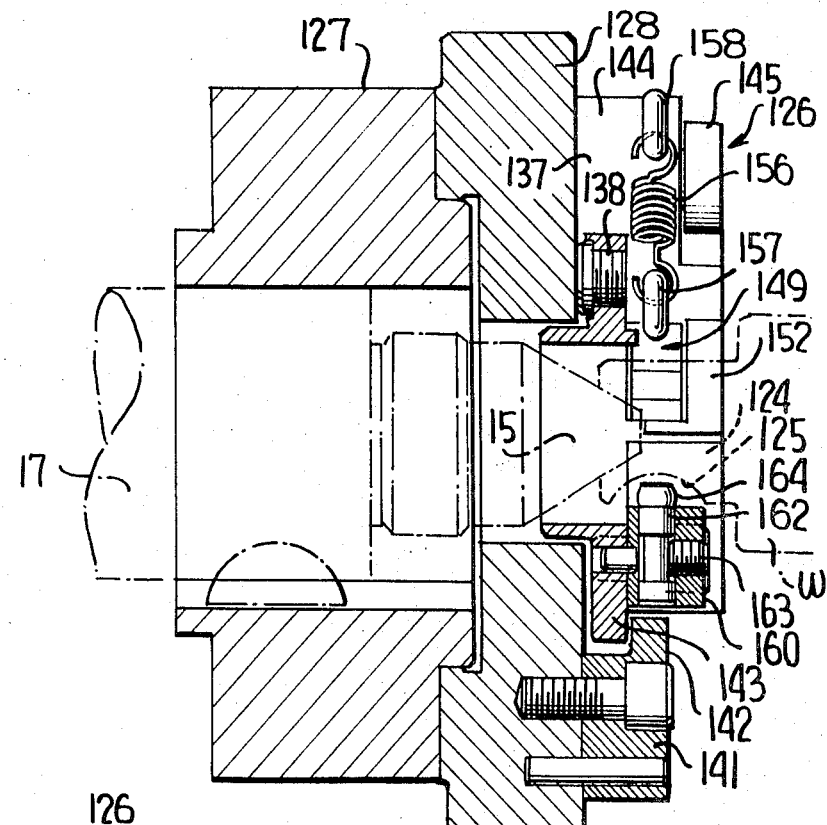
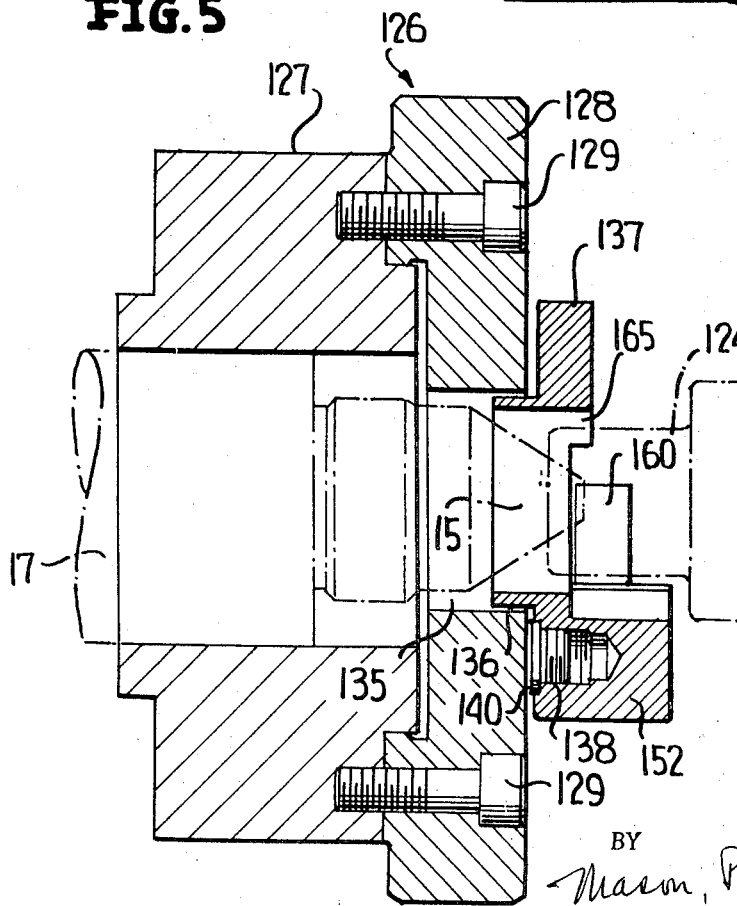
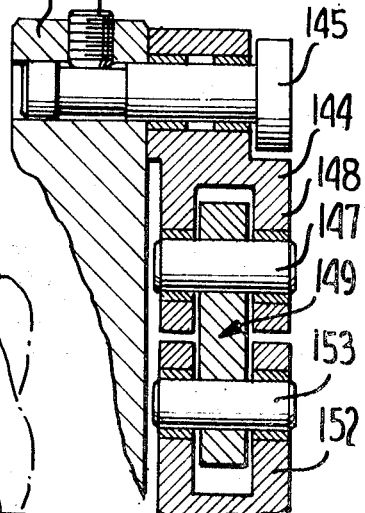

WORK-DRIVING DEVICE FOR CAMSHAFT GRINDER

This invention relates in general to new and useful improvements in work-driving devices for driving workpieces for a machining operation, and more particularly a work-driving device for use as part of a camshaft grinder for driving a camshaft during the grinding of cam contours thereof.

The work-driving device is particularly adapted for use in orienting and driving a camshaft which has an end portion of a reduced diameter and which end portion is provided with a keyway for the purpose of orienting a cam gear or sprocket relative to the camshaft.

In the past, the means for driving a camshaft consisted of a removable fixture which was placed on each camshaft before placing it in the cam-grinding machine. This fixture was removed from the camshaft after the camshaft had been ground. During the grinding operation, the fixture cooperated with a driving dog on a faceplate of the cam-grinding apparatus to rotate the camshaft. In this type of arrangement, the application of the driving force to the camshaft had a tendency to apply a radial force to the camshaft which would result in radial displacement of the camshaft.

It is, therefore, the primary object of this invention to provide a work-driving device which may be formed as part of a camshaft-grinding apparatus and with which a camshaft may be readily engaged in oriented relation and driven in a manner wherein there is no force to cause radial displacement of the camshaft.

Another object of this invention is to provide a novel work-driving device for a camshaft-grinding apparatus wherein the work-driving device utilizes the conventional keyway in the camshaft both for the orienting of the camshaft and the driving thereof.

A further feature of this invention is to provide a novel work-driving device which includes a driving block which is free to float radially and axially a limited amount to compensate for variations in workpieces.

With the above and other objects in view that will hereinafter appear, the nature of the invention will be more clearly understood by reference to the following detailed description, the appended claims and the several views illustrated in the accompanying drawings:

In the Drawings:

FIG. 1 is a plan view of a camshaft-grinding apparatus in which the work-driving device is utilized.

FIG. 2 is an enlarged fragmentary transverse sectional view taken along the line 2-2 of FIG. 1 and shows the work-driving device in elevation.

FIG. 3 is a view similar to FIG. 2 and shows the work-driving device in an inoperative position.

FIG. 4 is a fragmentary axial sectional view taken along the line 4-4 of FIG. 2.

FIG. 5 is a axial sectional view taken along the line 5-5 of FIG. 2.

FIG. 6 is a fragmentary axial sectional view taken along the line 6-6 of FIG. 2 and shows the adjustable mounting of a driver head of the work-driving device with respect to an adapter therefor.

FIG. 7 is an enlarged fragmentary axial sectional view taken along the line 7-7 of FIG. 3 and shows the specific details of a driving linkage between the driving block and the driver head.

Referring now to the drawings in detail, it will be seen that there is illustrated a conventional camshaft grinder which is generally referred to by the numeral 10. The camshaft grinder 10, among other features, includes a base 11 on which there is mounted a cradle 12 for rocking movement. At opposite ends of the cradle 12 there are mounted a headstock 13 and a tailstock 14. The headstock 13 includes a center 15, while the tailstock 14 includes a center 16. A camshaft or other workpiece W to be ground is mounted for rotation on the centers 15 and 16 at an axis determined by the centers.

The headstock 13 also includes a spindle 17 which is suitably driven by means of a motor 18. The spindle 17 has mounted thereon for rotation therewith a master cam 20. The master cam 20 is engaged by a follower 21 to effect the rocking of the cradle 12 in timed relation to the rotation of the workpiece W so as to produce the desired cam contour thereon.

The camshaft grinder 10 also includes a grinding wheel 22 which is suitably mounted in a conventional manner for selected engagement with the lobes of the camshaft or workpiece W.

Reference is now made to FIGS. 4 and 5 in particular wherein there is illustrated a workpiece to be ground, the workpiece being generally referred to by the letter W. The illustrated workpiece W is a camshaft of which only a front portion thereof is illustrated. The camshaft W has a front end portion 124 of a reduced diameter. The front end portion normally has positioned thereon a cam gear or sprocket for driving the camshaft. In order to couple such a cam gear or sprocket to the camshaft in oriented relation, the end portion 124 is provided with a keyway 125 in which key of the conventional type will normally be seated. It is this keyway 125 which is utilized in the orienting and driving of the camshaft W.

In order to couple the camshaft W to a conventional cam-grinding apparatus in oriented relation with respect to the master cam 20 thereof and for rotation therewith, the camshaft-grinding apparatus 10 is provided with a work-driving device which is generally referred to by the numeral 126. The work-driving device 126 is mounted on the spindle 17 in generally concentric relation with respect to the center 15. The work-driving device 126 includes an adapter 127 which is secured to the spindle 17 for rotation therewith and in a predetermined oriented relation with respect to the master cam 20. The adapter 127 has secured thereto a driver head or faceplate 128 by means of a pair of circumferentially spaced screws 129. It is to be noted that the screws 129 pass through slotted openings 139 in the faceplate 128 whereby a minor adjustment in a circumferential direction may be obtained between the faceplate 128 and adapter 127.

Referring now to FIGS. 2 and 6 in particular, it will be seen that the adjustment of the faceplate 128 relative to the adapter 127 is accomplished by providing the faceplate 128 with a rearwardly extending pin 130 which projects into a recess 131 formed in the adapter 127. on opposite sides of the recess 131, the adapter 127 is formed with lugs 132 which carry opposed positioning or adjusting screws 133. The screws 133 engage the opposite sides of the pin 130 and are locked in adjusted positions by means of locknuts 134.

The faceplate 128 is provided with a central opening 135 through which the center 15 projects. The central opening 135 receives a hub portion 136 of a driving block or floating member 137 which is floatingly carried by the faceplate 128 for limited free radial and axial movement.

As is best shown in FIGS. 4 and 5, axial movement of the floating member 137 towards the faceplate 128 is restricted by a plurality of pins 138 which have relatively thin flat heads 140 opposing the faceplate 128. Axial movement of the floating member 137 away from the faceplate 128 is restricted by a pair of keeper blocks 141 which is releaseably secured to the faceplate 128 and has flange portions 142 opposing flange portions 143 of the floating member 137. The positions of the keeper blocks 141 are best shown in FIGS. 2 and 3.

The floating member 137 is connected to the faceplate 128 for rotation therewith and for effecting rotation of an associated workpiece W by means of a suitable linkage which includes a link 144 which extends in a direction transversely from a clamp shoe 149. The link 144; is pivotally mounted on a pin 145 projecting from the face of the faceplate 128, as is best shown in FIG. 7. It is to be noted that the pin 145 is releaseably secured in place by means of a setscrew 146.

The end of the link 144 remote from the pivot pin 145 is bifurcated and is provided with a pivot pin 147. The bifurcated end portion, which is identified by the numeral 148, is coupled thereto by means of the pivot pin 147 to one leg of the clamp shoe 149.

The clamp shoe 149 is in the form of an L-shaped lever and includes a pair of legs 150 and 151. A central portion of the clamp shoe 149 is seated in a bifurcated arm portion 152 of the floating member 137 and is pivotally mounted relative thereto by means of a pivot pin 153. The leg 150 is seated in the bifurcated end portion 148 of the link 144 and is pivotally connected thereto by means of the pivot pin 147. The leg portion 151 carries a clamping jaw 155 which is engageable with the end portion 124 of a camshaft w.

It will be readily apparent that the linkage including the link 144 and the clamp shoe 149, in cooperation with the hub 136, the pins 138 and the keeper blocks 141, serve to loosely position the floating member 137 generally in centered relation with respect to the center 15.

In order to position the floating member 137 and the clamping jaw 155 for receiving a workpiece, there is provided a spring 156 which extends between a hook 157 on the leg 151 and a like hook 158 on the link 144. It is to be understood that the tension of the spring 156 is such that it may be readily overcome to permit the pivoting of the link 144 and the clamp shoe 149 during the operation of the work-driving device 126.

In order to facilitate the positioning of a workpiece W relative to the floating member 137, the floating member 137 is provided with a locating block 160 which is removably secured in place by means of suitable fasteners 161. The locating block 160 carries a locating pin 162 which projects radially towards the axis defined by the centers 15 and 16 and, as is best shown in FIG. 4, is secured in place by means of a setscrew 163. It is to be noted that the locating pin 162 is provided with a part spherical head portion 164 of a size to be snugly received within the keyway 125 while at the same time permitting a limited pivoting of the floating member 137 relative to the workpiece W.

OPERATION

When it is desired to grind the camshaft W, the camshaft is rotationally oriented until the keyway 125 thereof is generally aligned with the locating pin 162. Then the end portion 124 of the camshaft is loosely positioned in a central opening 165 in the floating member 137 and slightly rotated until the head 164 of the locating pin 162 is received in the keyway 125. Then the camshaft is pushed up onto the center 15 and is centered thereby. Next the center 16 is brought into engagement with the opposite end of the camshaft so as to fully support the camshaft and fix the axis of rotation thereof.

At this time, the camshaft is not engaged by the jaw 155. However, when rotation of the faceplate 128 in a counterclockwise direction, as viewed in FIG. 3, is effected, a pull directed on the link 144 will result in the pivoting of the clamp shoe 149 about the pivot pin 153 with the result that the clamping jaw 155 will move into clamping engagement with the end portion 124 of the camshaft at a point circumferentially remote from the keyway 125. This will result in a slight pivoting of the floating member 137 in a counterclockwise direction relative to the workpiece about the pivot defined by the head 164 of the locating pin 162 to the position best shown in FIG. 2. When the floating member 137 and the camshaft W have rotated to this position relative to the faceplate 128, the camshaft w will be properly oriented with respect to the master cam 20.

It is to be understood that not only will the work-driving device 126 properly orient the camshaft W relative to the master cam 20, but because of the circumferentially spaced points of driving engagement between the work-driving device 126 and the workpiece, the force applied to the workpiece will be solely a rotational force and there will be no radial component which will tend to shift the workpiece radially relative to the center 15.

Although only a preferred embodiment of the work-driving device has been specifically illustrated and described, it is to be understood that minor variations may be made in the work-driving device without departing from the spirit of the invention.

I claim:

1. In a machine tool for machining a workpiece to a predetermined and oriented configuration and wherein said machine tool includes a pattern device, a work-driving device for transmitting torque to a workpiece, said work-driving device comprising torque-transmitting means having a radially extending arm, said torque-transmitting means including an indexing element for maintaining a substantially fixed oriented relationship between said pattern device and said workpiece, said torque-transmitting means further including work-engaging means pivotally mounted on said arm for rotation relative to said arm for engaging said workpiece at a point angularly spaced from said indexing element upon rotation of said torque-transmitting means, whereby the torque is applied at least at two angularly spaced points on the workpiece, a driving member, said work-engaging means being pivotally connected by a link to said driving member which is disposed in angularly spaced relation to said arm, whereby said torque-transmitting means is free to float in all radial directions and thus adapt itself for varying conditions of the workpiece.

2. The work-driving device of claim 1, and further including means restraining said torque-transmitting means against axial movement.

3. The work driving device of claim 2 wherein said restraining means includes spaced lips and flat head pins.

4. In a machine tool for machining a workpiece to a predetermined and oriented configuration and wherein said machine tool includes a pattern device, a work-driving device for transmitting torque to a workpiece, said work-driving device comprising torque-transmitting means having a radially extending arm, said torque-transmitting means including an indexing element for maintaining a substantially fixed oriented relationship between said pattern device and said workpiece, said torque-transmitting means further including work-engaging means pivotally mounted on said arm for rotation relative to said arm for engaging said workpiece at a point angularly spaced from said indexing element upon rotation of said torque-transmitting means, whereby the torque is applied at least at two angularly spaced points on the workpiece, said machine tool being a camshaft grinder and being particularly adapted for machining a camshaft having a radially extending orienting keyway in its periphery near one end thereof, said torque-transmitting means being in the form of a floating member mounted for limited radial and axial floating movement for compensating for slight variations in workpieces, and said indexing element being in the form of a pin adapted to snugly engage in a camshaft orienting keyway.

5. In a machine tool of the type particularly adapted for machining a workpiece to a predetermined and oriented configuration, and wherein said machine tool includes a pair of opposed centers adapted to have a workpiece mounted therebetween for rotation about a predetermined axis, and a pattern device; a work-driving device particularly adapted for cooperation with a workpiece having an orienting recess at one end thereof, said work-driving device comprising a faceplate mounted for rotation about said axis adjacent one of said centers, said faceplate being in fixed oriented relation to said pattern device, a floating driving member mounted on said faceplate for limited axial and radial floating movement, a driving connection between said faceplate and said floating driving member, an indexing element carried by said floating driving member for engagement in a workpiece recess both to index a workpiece and to facilitate the rotation thereof, a gripping member pivotally mounted with respect to said floating driving member engageable with a workpiece in circumferentially spaced relation to said indexing element upon relative pivoting of said floating driving member about said indexing element and cooperable with said indexing element to drive a workpiece while applying a minimal radial force to the workpiece.

6. The machine tool of claim 5 wherein said driving connection includes a pivotal link and said pivotal link forms the sole driving connection between said floating driving member and said faceplate.

7. In a machine tool for machining a workpiece to a predetermined and oriented configuration and wherein said machine tool includes a pattern device, a work-driving device for transmitting torque to a workpiece, said work-driving device including a faceplate, a torque-transmitting member, means mounting said torque-transmitting member on said faceplate for freedom to float in all radial directions whereby said torque-transmitting member is adaptable to varying workpieces, an indexing element carried by said torgue-transmitting member for maintaining a substantially fixed oriented relationship between said pattern device and a workpiece, a link connecting said torque-transmitting member to said faceplate for applying a driving force to said torque-transmitting member, and further work-engaging means for drivingly engaging a workpiece at a point remote from said indexing element, mounting means pivotally mounting said further work-engaging means on said torque-transmitting member, and said link being directly connected to said mounting means for actuating said further work-engaging means in response to engagement of said indexing element with a workpiece and rotation of said face plate whereby torque is applied at two angularly spaced points on a workpiece.

8. The work-driving device of claim 7 wherein said mounting means is in the form of a lever having said further work-engaging member at one end and being connected to said link at the opposite end.

9. The work-driving device of claim 8 wherein a resilient element extends between and connects together remote ends of said link and said lever and normally urges said further work-engaging member to a retracted position.

10. The work-driving device of claim 8 wherein said lever is pivotally mounted on said torque-transmitting member remote from said indexing element.

11. The machine tool of claim 1 wherein said link extends generally transversely of said arm and generally away from said arm in the direction of work-driving movement of said driving member.

12. In a machine tool for machining a workpiece wherein said machine tool includes a work-driving device for transmitting torque to a workpiece, said work-driving device comprising torque-transmitting means having a radially extending arm, said torque-transmitting means including an indexing element for maintaining a substantially fixed oriented relationship between said workpiece and said torque-transmitting means, said torque-transmitting means further including work-driving means pivotally mounted on said arm for rotation relative to said arm for engaging said workpiece at a point angularly spaced from said indexing element upon rotation of said torque-transmitting means, whereby the torque is applied at least at two angularly spaced points on the workpiece, said machine tool being a grinder and being particularly adapted for machining a workpiece having a radially extending orienting keyway in its periphery near one end thereof, said torque-transmitting means being in the form of a floating member mounted for limited radial and axial floating movement to enable equal driving pressure, and said indexing element being in the form of a pin adapted to snugly engage in a workpiece orienting keyway.